(12) United States Patent
Takeda et al.

(10) Patent No.: US 11,516,851 B2
(45) Date of Patent: Nov. 29, 2022

(54) USER TERMINAL AND RADIO COMMUNICATION METHOD

(71) Applicant: NTT DOCOMO, INC., Tokyo (JP)

(72) Inventors: Kazuaki Takeda, Tokyo (JP); Kazuki Takeda, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 16/316,763

(22) PCT Filed: Jul. 14, 2017

(86) PCT No.: PCT/JP2017/025736
§ 371 (c)(1),
(2) Date: Jan. 10, 2019

(87) PCT Pub. No.: WO2018/012618
PCT Pub. Date: Jan. 18, 2018

(65) Prior Publication Data
US 2019/0159265 A1    May 23, 2019

(30) Foreign Application Priority Data
Jul. 15, 2016  (JP) .............................. JP2016-140715

(51) Int. Cl.
*H04W 74/08* (2009.01)
*H04W 28/06* (2009.01)

(52) U.S. Cl.
CPC ....... *H04W 74/0833* (2013.01); *H04W 28/06* (2013.01); *H04W 74/08* (2013.01)

(58) Field of Classification Search
CPC .. H04W 28/06; H04W 74/08; H04W 74/0833
See application file for complete search history.

(56) References Cited

U.S. PATENT DOCUMENTS

| | | | |
|---|---|---|---|
| 10,454,637 B2* | 10/2019 | Murakami | H04J 1/02 |
| 2009/0109919 A1 | 4/2009 | Bertrand et al. | |
| 2011/0070850 A1* | 3/2011 | Kwon | H04B 7/06 455/129 |
| 2015/0373743 A1 | 12/2015 | Kim et al. | |

(Continued)

FOREIGN PATENT DOCUMENTS

| | | | | |
|---|---|---|---|---|
| WO | 2014119832 A1 | 8/2014 | | |
| WO | WO-2014119832 A1 * | 8/2014 | ......... | H04L 27/2613 |

OTHER PUBLICATIONS

International Search Report issued in PCT/JP2017/025736 dated Oct. 10, 2017 (1 page).

(Continued)

*Primary Examiner* — Mehmood B. Khan
(74) *Attorney, Agent, or Firm* — Osha Bergman Watanabe & Burton LLP

(57) ABSTRACT

To suitably perform a random access procedure (e.g., random access preamble transmission) in future radio communication systems, a user terminal for communicating with a cell where predetermined numerology is applied has a control section that controls a random access procedure in the cell, and a transmission section that transmits a random access preamble with a predetermined subcarrier spacing applied among random access preambles for supporting a plurality of subcarrier spacings.

10 Claims, 11 Drawing Sheets

(56) References Cited

U.S. PATENT DOCUMENTS

| | | | |
|---|---|---|---|
| 2018/0255586 A1* | 9/2018 | Einhaus | H04W 52/00 |
| 2019/0149384 A1* | 5/2019 | Kim | H04L 27/2666 370/328 |
| 2020/0314908 A1* | 10/2020 | Hwang | H04W 56/0005 |

OTHER PUBLICATIONS

Written Opinion of the International Searching Authority issued in PCT/JP2017/025736 dated Oct. 10, 2017 (3 pages).

NTT DOCOMO, Inc.; "Design for RACH Procedure for NR"; 3GPP TSG RAN WG1 Meeting #86, R1-167378 Goteborg, Sweden; Aug. 22-26, 2016 (4 pages).

NTT DOCOMO, Inc.; "Design for RACH preamble for NR"; 3GPP TSG RAN WG1 Meeting #86, R1-167377 Goteborg, Sweden; Aug. 22-26, 2016 (7 pages).

3GPP TS 36.300 V12.4.0; "3rd Generation Partnership Project; Technical Specification Group Radio Access Network Evolved Universal Terrestrial Radio Access (E-UTRA) and Evolved Universal Terrestrial Radio Access Network (E-UTRAN); Overall description; Stage 2 (Release 12)"; Dec. 2014 (251 pages).

Extended European Search Report issued in the counterpart European Patent Application No. 17827741.4, dated Jan. 29, 2020 (7 pages).

Office Action issued in Japanese Application No. 2018-527683; dated Jun. 15, 2021 (7 pages).

Office Action in counterpart European Patent Application No. 17 827 741.4 dated Jun. 30, 2021 (5 pages).

Huawei et al; "Initial access in NR"; 3GPP TSG-RAN WG2 Meeting #94, R2-163923; Nanjing, China; May 23-27, 2016 (4 pages).

Office Action issued in the counterpart Indian Patent Application No. 201917000218, dated Sep. 15, 2021 (6 pages).

\* cited by examiner

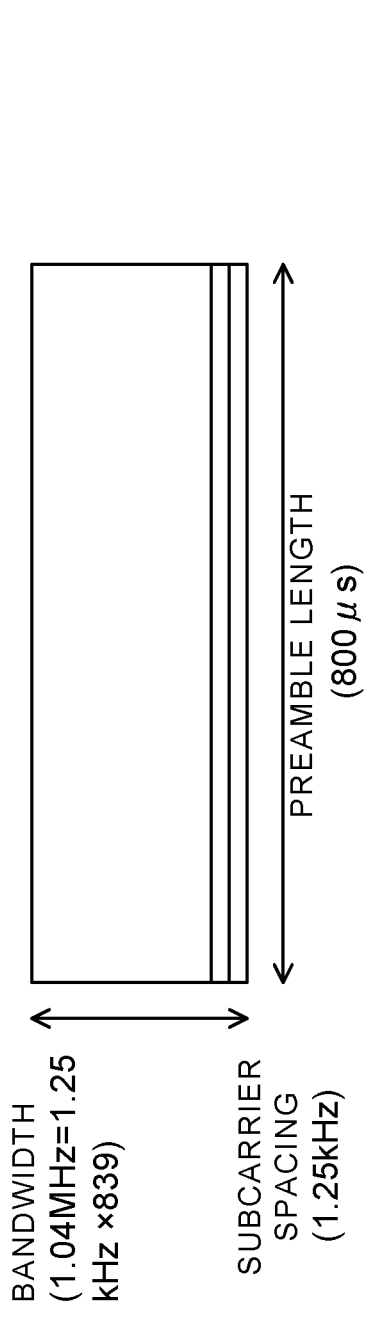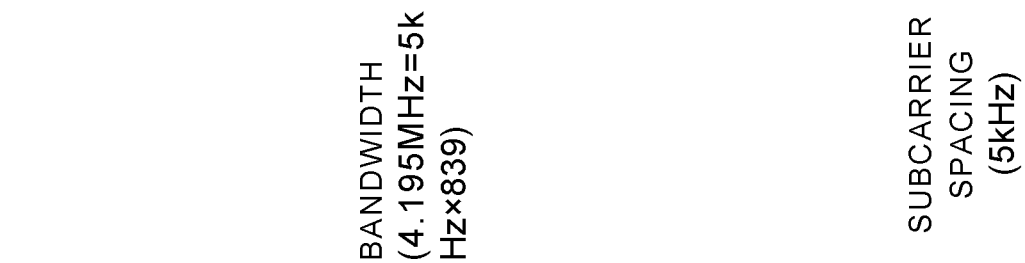

FIG. 4B

USER TERMINAL AND RADIO COMMUNICATION METHOD

TECHNICAL FIELD

The present invention relates to a user terminal and radio communication method in the next-generation mobile communication system.

BACKGROUND ART

In UMTS (Universal Mobile Telecommunications System) networks, for the purpose of higher data rates, low delay and the like, Long Term Evolution (LTE) has been specified (Non-patent Document 1). Further, for the purpose of wider bands and higher speed than LTE, successor systems (e.g., also referred to as LTE-A (LTE-Advanced), FRA (Future Radio Access), 4G, 5G, 5G+ (plus), NR (New RAT), LTE Rel. 14, 15~, etc.) to LTE have been studied.

In the existing LTE system (e.g., LTE Rel. 8-13), when UL synchronization is established between a radio base station and a user terminal, the user terminal is capable of transmitting UL data. Therefore, in the existing LTE system is supported the random access procedure (also referred to as RACH procedure: Random Access Channel Procedure, access procedure) to establish UL synchronization.

In the random access procedure, the user terminal acquires information (Timing Advance (TA)) about UL transmission timing by a response (random access response) from the radio base station to a preamble (random access preamble) selected randomly, and based on the TA, establishes UL synchronization.

After establishing UL synchronization, upon receiving downlink control information (DCI) (UL grant) from the radio base station, using UL resources allocated with the UL grant, the user terminal transmits UL data.

PRIOR ART DOCUMENT

Non-patent Document

[Non-patent Document 1] 3GPP TS 36.300 "Evolved Universal Terrestrial Radio Access (E-UTRA) and Evolved Universal Terrestrial Radio Access Network (E-UTRAN); Overall description; Stage 2"

DISCLOSURE OF INVENTION

Problems to be Solved by the Invention

In future radio communication systems (e.g., 5G, NR, etc.), it is demanded that a single framework accommodates various services such as high-speed high-capacity communication (eMBB: enhanced Mobile Broad Band), massive connection (massive MTC) from IoT (Internet of Things) devices or devices of Machine-to-Machine (M2M) communication such as MTC (Machine Type Communication), and Ultra-reliable and Low Latency Communication (URLLC).

Thus, in the future radio communication system, it is expected that a plurality of services with different requests for delay reduction coexists. Therefore, in the future radio communication system, it is desired to accommodate a plurality of user terminals with different numerology (also referred to as multiple numerology, etc.). Herein, the numerology refers to communication parameters in both or one of the frequency domain and the time domain (e.g., at least one of the subcarrier spacing, bandwidth, symbol length, CP (Cyclic Prefix) length, TTI length, the number of symbols per TTI, radio frame configuration, filtering processing, windowing processing and the like).

In the future radio communication system for accommodating a plurality of user terminals with different numerology, there is the issue of how to control the random access procedure. For example, it has not been determined yet how to set a configuration of the random access preamble transmitted from a user terminal, and it is desired to make a configuration suitable for used numerology.

The present invention was made in view of such a respect, and it is an object of the invention to provide a user terminal and radio communication method capable of suitably performing a random access procedure (e.g., random access preamble transmission) in future radio communication systems.

Means for Solving the Problem

A user terminal according to one aspect of the present invention is a user terminal for communicating with a cell where predetermined numerology is applied, and is characterized by having a control section that controls a random access procedure in the cell, and a transmission section that transmits a random access preamble with a predetermined subcarrier spacing applied among random access preambles for supporting a plurality of subcarrier spacings.

Advantageous Effect of the Invention

According to the present invention, in future radio communication systems, it is possible to suitably perform the random access procedure (e.g., random access preamble transmission).

BRIEF DESCRIPTION OF DRAWINGS

FIGS. 3A and 3B are diagrams showing one example of random access preambles with different subcarrier spacings;

FIGS. 4A to 4C are diagrams showing one example of random access preambles;

BEST MODE FOR CARRYING OUT THE INVENTION

The existing LTE system (e.g., LTE Rel. 8-13) supports random access procedures to establish UL synchronization.

The random access procedures include contention-based random access (also referred to as CBRA: Contention-Based Random Access, etc.) and non-contention-based random access (also referred to as Non-CBRA, Contention-Free Random Access (CFRA), etc.).

In the contention-based random access (CBRA), a user terminal transmits a preamble randomly selected from among a plurality of preambles (also referred to as the random access preamble, random access channel (PRACH: Physical Random Access Channel), RACH preamble, etc.) determined in each cell. Further, the contention-based random access is a random access procedure initiated by the user terminal, and for example, it is possible to use at the time of initial access, start or restart of UL transmission and the like.

On the other hand, in the non-contention-based random access (Non-CBRA, CFRA: Contention-Free Random Access), the radio base station assigns a preamble specific to a user terminal using a downlink (DL) control channel (PDCCH: Physical Downlink Control Channel, EPDCCH: Enhanced PDCCH and the like), and the user terminal transmits the preamble assigned by the radio base station. The non-contention-based random access is the random access procedure initiated by the network, and for example, is used at the time of handover, start or restart of DL transmission (start or restart of transmission of retransmission instruction information for DL on UL).

Figure 1:
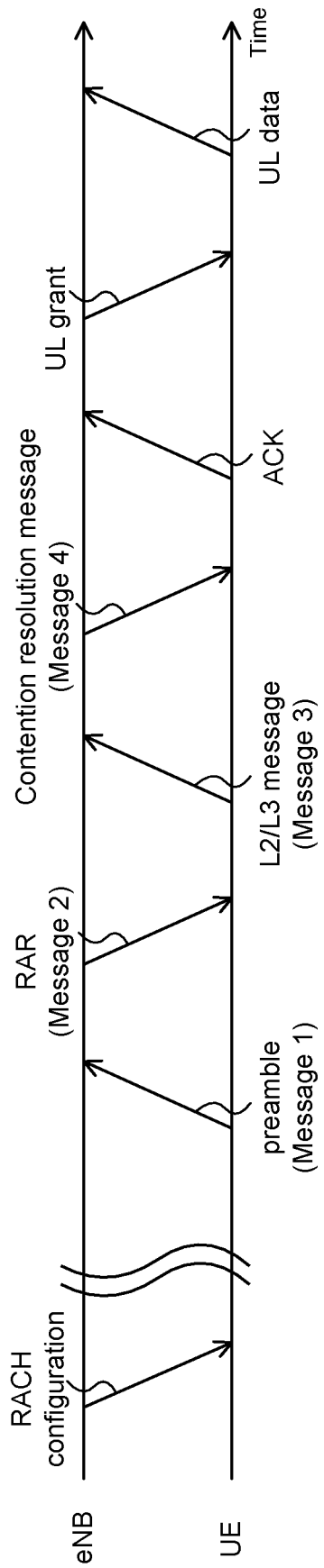
FIG. 1 is a diagram showing one example of a contention-based random access procedure.

FIG. 1 is a diagram showing one example of contention-based random access. In FIG. 1, the user terminal beforehand receives information (PRACH configuration information) indicative of a configuration (PRACH configuration, RACH configuration) of the random access channel (PRACH), using system information (e.g., MIB (Master Information Block) and/or SIB (System Information Block)), and higher layer signaling (e.g., RRC (Radio Resource Control) signaling).

For example, the PRACH configuration information is capable of indicating a plurality of preambles (e.g., preamble format) determined in each cell, time resources (e.g., system frame number, subframe number) used in PRACH transmission, an offset (prach-Frequency Offset) indicative of a start position of frequency resources (e.g., 6 resource blocks (PRB: Physical Resource Block)) and the like.

As shown in FIG. 1, in the case where the user terminal transits from an idle (RRC_IDLE) state to an RRC connected (RRC_CONNECTED) state (e.g., at the time of initial access), in the case where the state is the RRC connected state, but UL synchronization is not established (e.g., at the time of start or restart of UL transmission), and the like, the user terminal selects randomly one of a plurality of preambles indicated by the PRACH configuration information, and transmits the selected preamble on the PRACH (Message 1).

Upon detecting the preamble, the radio base station transmits a Random Access Response (RAR) as a response to the preamble (Message 2). After transmitting the preamble, when the user terminal fails to receive the RAR within a predetermined period (RAR window), the terminal increases transmit power of the PRACH to transmit (retransmit) the preamble again. In addition, increasing transmit power in retransmission is also called power ramping.

The user terminal receiving the RAR adjusts transmission timing of UL, and establishes synchronization of UL, based on the timing advance (TA) included in the RAR. Further, the user terminal transmits a control message of the higher layer (L2/L3: Layer 2/Layer 3) in UL resources designated by a UL grant included in the RAR (Message 3). The control message includes an identifier of the user terminal (UE-ID). For example, the identifier of the user terminal may be C-RNTI (Cell-Radio Network Temporary Identifier) in the RRC connected state, or may be UE-ID of the higher layer such as S-TMSI (System Architecture Evolution-Temporary Mobile Subscriber Identity) in the idle state.

In response to the control message of the higher layer, the radio base station transmits a contention resolution message (Message 4). The contention resolution mess age is transmitted based on the identifier destination of the user terminal included in the control message. The user terminal succeeding detection of the contention resolution message transmits acknowledgement (ACK: Acknowledge) in HARQ (Hybrid Automatic Repeat reQuest) to the radio base station. By this means, the user terminal in the idle state transits to the RRC connected state.

On the other hand, the user terminal failing to detect the contention resolution message determines that the contention arises, re-selects a preamble, and repeats the random access procedure of Messages 1 to 4. Upon detecting that the contention is resolved by ACK from the user terminal, the radio base station transmits a UL grant to the user terminal. The user terminal starts UL data using UL resources allocated by the UL grant.

In the contention-based random access as described above, the user terminal is capable of autonomously starting the random access procedure in the case of desiring transmission of UL data. Further, since the UL data is transmitted using UL resources allocated specific to the user terminal by the UL grant after UL synchronization is established, it is possible to perform UL transmission with high reliability.

In the above-mentioned random access procedure, the random access preamble (PRACH) transmitted from the user terminal is comprised of a cyclic prefix (CP) interval, preamble interval, and guard time (GT) interval. Further, specified are four Preamble formats available for user terminals in transmission of a random access preamble.

Figure 2:
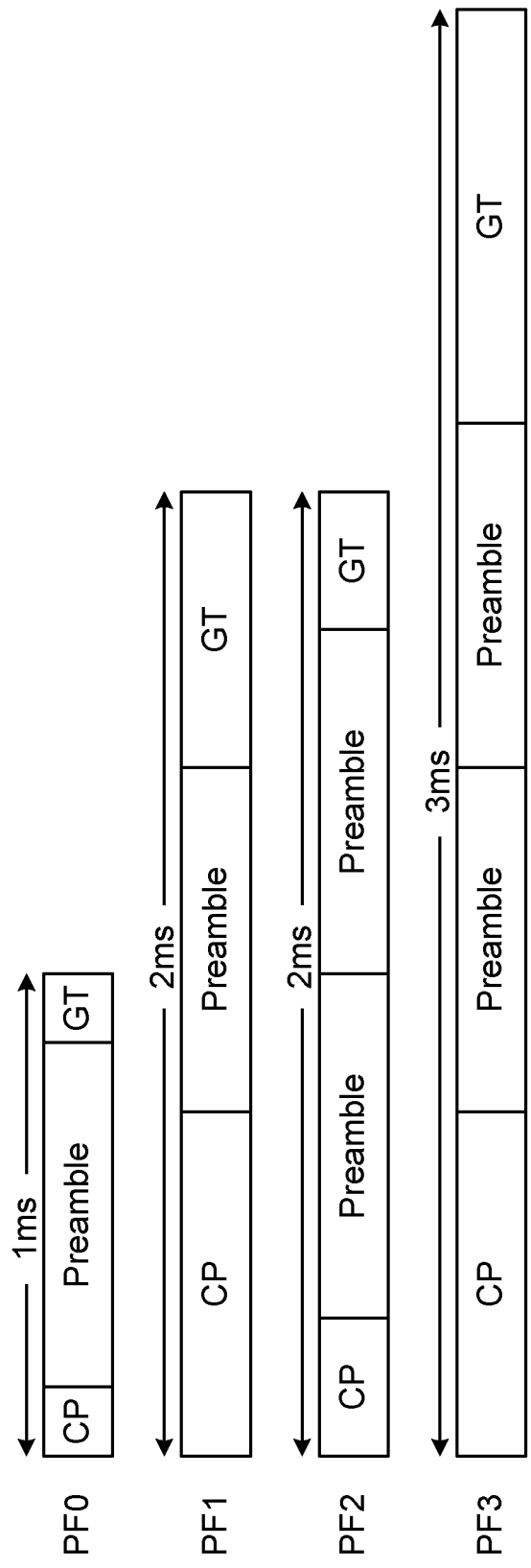
FIG. 2 is a diagram showing one example of preamble formats.

As shown in FIG. 2, Preamble format 0 has a TTI length of 1 [ms], has a CP interval of 102.6 [μs], preamble interval of 800 [μs] and GT interval of 97.4 [μs], and further has coverage of up to 15 [km]. Preamble format 1 has a TTI length of 2 [ms] or 3 [ms], has a CP interval of 684 [μs], preamble interval of 800 [μs] and GT interval of 516 [μs], and further has coverage of up to 77 [km] in the case of the TTI length of 2 [ms], while having coverage of up to 100 [km] in the case of the TTI length of 3 [ms]. Preamble format 2 has a TTI length of 2 [ms], has a CP interval of 202.6 [μs], preamble interval of 2×800 [μs] and GT interval of 197.4 [μs], and further has coverage of up to 30 [km]. Preamble format 3 has a TTI length of 3 [ms], has a CP interval of 684 [μs], preamble interval of 2×800 [μs] and GT interval of 716 [μs], and further has coverage of up to 100 [km].

Further, in the existing LTE system, the subcarrier spacing (SC spacing) of the random access preamble is defined as 1.25 kHz in Preamble formats 0 to 3.

In addition, in a radio access scheme (5G RAT) of the future radio communication system, in order to support wide frequency bands and various services with different requirements, it is expected to introduce a plurality of numerology (also referred to as multiple numerology). Herein, the numerology refers to a set of communication parameters (radio parameters) in both or one of the frequency domain and the time domain. For example, the set of communication parameters may include at least one of the subcarrier spacing, bandwidth, symbol length, CP length, TTI length, the number of symbols per TTI, radio frame configuration, filtering processing, windowing processing and the like.

"Numerology differs" refers to a difference between numerology, for example, in at least one of the subcarrier spacing, bandwidth, symbol length, CP length, TTI length, the number of symbols per TTI, radio frame configuration and the like, but is not limited thereto.

In future radio communication systems supporting multiple numerology, it is expected to perform communication by applying different numerology in the same carrier or different carrier. In this case, in the future radio communication system supporting multiple numerology, there is the issue of how to control the random access procedure as described above. For example, it has not been determined yet how to set a configuration of the random access preamble transmitted from a user terminal, and it is desired to make a configuration suitable for used numerology.

FIGS. 3A and 3B are diagrams showing one example of random access preambles with different subcarrier spacings. In the random access preamble (e.g., the number of sequences is 839) shown in FIG. 3A, the bandwidth is 1.04 MHz. This corresponds to 839 subcarriers with the subcarrier spacing of 1.25 kHz. Further, in the random access preamble, the preamble length is 800 μs.

On the other hand, in the random access preamble shown in FIG. 3B, the bandwidth is 4.195 MHz. This corresponds to 839 subcarriers with the subcarrier spacing of 5 kHz. Further, in the random access preamble, the preamble length is 200 μs. The bandwidth (subcarrier spacing) of the random access preamble shown in FIG. 3B is about 4 times the bandwidth (subcarrier spacing) of the random access preamble shown in FIG. 3A. Furthermore, the preamble length of the random access preamble shown in FIG. 3B is one-fourth the preamble length of the random access preamble shown in FIG. 3A. Thus, the subcarrier spacing and the preamble length are in the reciprocal relationship with each other. In addition, the bandwidth, subcarrier spacing and preamble length of the random access preamble are not limited to the examples shown in FIGS. 3A and 3B, and are capable of being set as appropriate.

The bandwidth affects timing accuracy (timing offset estimation accuracy). Further, the subcarrier spacing and bandwidth affect the capacity and contention possibility. For example, when the subcarrier spacing is wide, it is possible to effectively prevent inter-channel interference caused by Doppler-shift in a shift of a user terminal and transmission quality deterioration caused by phase noise of a receiver of a user terminal. Particularly, in high frequency bands of several tens of gigahertz and the like, by widening the subcarrier spacing, it is possible to effectively prevent the transmission quality from deteriorating.

Therefore, the numerology shown in FIG. 3B with the wide subcarrier spacing is suitable for communication in high frequency bands. Further, by widening the subcarrier spacing, since tolerance to high-speed shifts is increased, the numerology shown in FIG. 3B with the wide subcarrier spacing is suitable for high-speed shifts.

The preamble length affects the SNR (Signal Noise Ratio) and cell radius. For example, at relatively low carrier frequencies (e.g., 6 GHz band or less), a priority is given to securing of coverage, and suitable is the numerology shown in FIG. 3A with the narrow subcarrier spacing that is the same as in the existing LTE system.

On the other hand, at high carrier frequencies (6 GHz to 100 GHz), in consideration of availability of wide bandwidth, and tolerance to phase noise and the like, it is considered that the subcarrier spacing is increased to increase the TTI length. In the preamble, similarly, it is considered that the numerology shown in FIG. 3B is suitable where the subcarrier spacing is increased and the preamble length is short. The numerology is also suitable for Massive MIMO (Massive Multiple-Input and Multiple-output) using a large amount of antenna elements. Further, in URLLC (Ultra-reliable and low latency communication), the data amount is small, but delay reduction is required. It is considered that the numerology is also suitable for such services where requirements for delay are severe. Furthermore, as another example, in a high-speed shift environment, since high tolerance to the Doppler frequency is required, such numerology with a short TTI length is suited.

Further, according to the numerology shown in FIG. 3A, since the entire length of the preamble is increased, also in the case where the ratio of the CP length occupied in the entire length of the preamble is certain, it is possible to increase the CP length. By this means, it is possible to perform (robust) radio communication with higher tolerance to multipath fading in a communication path.

Furthermore, the numerology used in a user terminal may be set semi-statically by higher layer signaling and the like such as RRC (Radio Resource Control) signaling and broadcast information, or may be changed dynamically by physical layer control information (L1/L2 control channel). Alternatively, the numerology may be changed by combination of the higher layer signaling and physical layer control information. Further, in addition to the numerology, sequences or sequence lengths of a plurality of preambles may be defined to set on UE.

Thus, the inventors of the present invention noted the respect that a configuration (numerology) of the subcarrier spacing and the like suitable for a random access preamble differs in communication environments (e.g., carrier frequency, service type, shift speed, etc.) and the like, and conceived defining random access preambles for supporting a plurality of subcarrier spacings and the like which may be different from numerology of another physical channel. For example, random access preambles for supporting a plurality of subcarrier spacings are defined, and a user terminal transmits a random access preamble having one of the subcarrier spacings.

In other words, a user terminal according to one aspect of the present invention is a user terminal for communicating with a cell where predetermined numerology is applied, controls a random access procedure in the cell, and transmits a random access preamble with a predetermined subcarrier spacing applied among random access preambles for supporting a plurality of subcarrier spacings.

Thus, by defining random access preambles for supporting a plurality of subcarrier spacings, it is possible to suitably perform the random access procedure (e.g., random access preamble transmission) in future radio communication systems.

Herein, the random access preamble (PRACH) transmitted from the user terminal is comprised of a cyclic prefix (CP) interval, preamble interval, and guard time (GT) interval. The configuration of the random access preamble is configured by at least the subcarrier spacing and the repetition number of preamble symbols. In other words, in the above-mentioned one aspect, the random access preamble with the predetermined subcarrier spacing applied may be transmitted repeatedly. By this means, it is possible to increase the SNR.

In addition, with respect to the random access preamble that corresponds to the numerology, preamble formats are specified. The preamble formats of the random access preamble that corresponds to the numerology are also included in the present invention.

One Embodiment of the present invention will be described below in detail with reference to drawings. In addition, random access procedures according to this Embodiment are capable of being applied to contention-based random access and non-contention-based random access.

(Aspect 1)

In Aspect 1, insetting random access preambles for supporting a plurality of subcarrier spacings, used is a plurality of subcarrier spacings with multiples of a predetermined value (e.g., 1.25 kHz). In Aspect 1, it is possible to set the subcarrier spacing of the random access preamble independently of the subcarrier spacing applied to the UL data channel. By this means, it is possible to properly perform time error estimation.

In Aspect 1, as in the LTE system, it is possible to set a plurality of subcarrier spacings based on the subcarrier spacing of 1.25 kHz. For example, 1.25 kHz, 2.5 kHz, 5 kHz, 10 kHz, 20 kHz, 40 kHz . . . . By thus setting the multiples to the power of two, it is possible to facilitate expansion of the LTE system. Further, it is also possible that the user terminal selects the same subcarrier spacing as that of the random access preamble of the LTE system corresponding to requirements.

(Aspect 2)

In Aspect 2, insetting random access preambles for supporting a plurality of subcarrier spacings, used is a plurality of subcarrier spacings with multiples of a subcarrier spacing (e.g., 15 kHz) that is different from that of the random access preamble of the existing LTE system.

In Aspect 2, as in the data channel, it is possible to set a plurality of subcarrier spacings based on the subcarrier spacing of 15 kHz. For example, 3.75 kHz, 15 kHz, 30 kHz, 60 kHz, 120 kHz . . . . By thus setting, since the same subcarrier spacing as in other physical channels is set, it is possible to omit a guard band between different channels.

In Aspects 1 and 2, random access preambles for supporting a plurality of subcarrier spacings are set, and a random access preamble associated with a subcarrier spacing may be selected based on a predetermined condition. Herein, as the predetermined condition, there are the type of numerology, SNR, shift speed and the like. Thus, by selecting a random access preamble with a particular subcarrier spacing from among the random access preambles for supporting a plurality of subcarrier spacings based on the predetermined condition, it is possible to transmit a proper random access preamble corresponding to the requirements and the like. As a result, it is possible to suitably perform the random access procedure.

Further, in Aspects 1 and 2, the random access preamble may set fora beforehand defined bandwidth (one or plural). By this means, the user terminal is capable of transmitting a suitable random access preamble corresponding to requirements such as time error estimation.

Figure 4A:
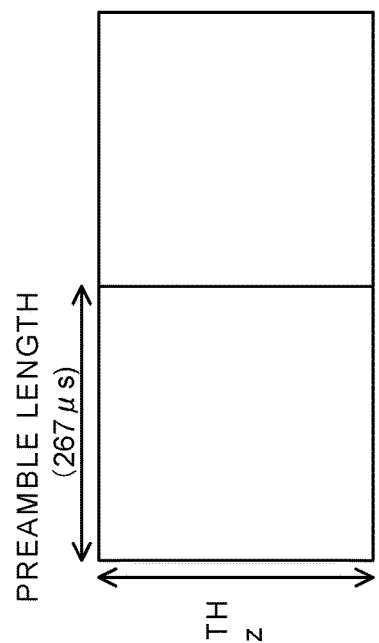

Further, in Aspects 1 and 2, as described above, the random access preamble is set by at least the subcarrier spacing and the repetition number of preamble symbols. For example, as shown in FIG. 4A, it is possible to configure the random access preamble with a bandwidth (about 1 MHz) that corresponds to 67 subcarrier spacings of 15 kHz. Further, in this case, it is preferable to transmit the random access preamble repeatedly.

In this case, in the random access preamble comprised of repeated symbols with a preamble length of 66 µs, analog beam forming (beam forming method of forming beams subsequent to RF conversion) may be applied to scan the direction of the beam for each symbol (beam scanning). By this means, it is possible to enhance the SNR.

On the other hand, as shown in FIG. 4B, it is possible to configure the random access preamble with a bandwidth (about 1 MHz) that corresponds to 277 subcarrier spacings of 3.75 kHz. In this case, in the random access preamble comprised of repeated symbols with a preamble length of 276 has, application of analog beam forming is not suitable, and therefore, it is preferable to enhance the SNR by symbol combining. In addition, the random access preamble is not limited to the examples shown in FIGS. 4A and 4B, and is capable of being set as appropriate.

Figure 4C:
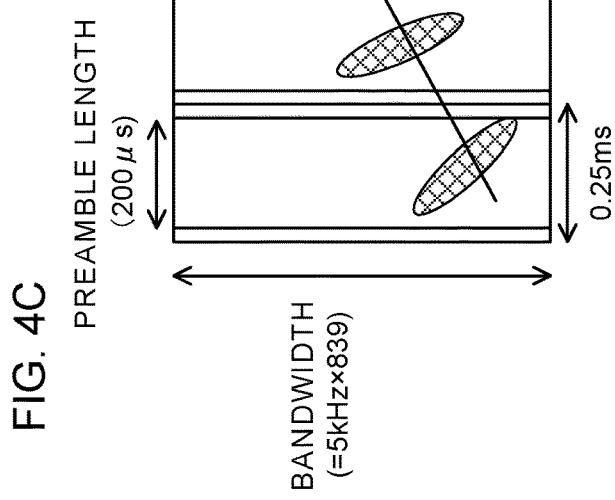

Further, in scanning the direction of the beam, as shown in FIG. 4C, CP and GT may be added for each preamble to transmit only a preamble associated with an optimal beam. Herein, it is possible to beforehand measure the optimal beam, using a downlink synchronization signal (SS), reference signal (BRS) for beam detection and the like. In the configuration of FIG. 4C, as compared with the case of transmitting the preamble repeatedly as shown in FIG. 4A, it is possible to halt transmission of an unnecessary preamble.

Figure 5:
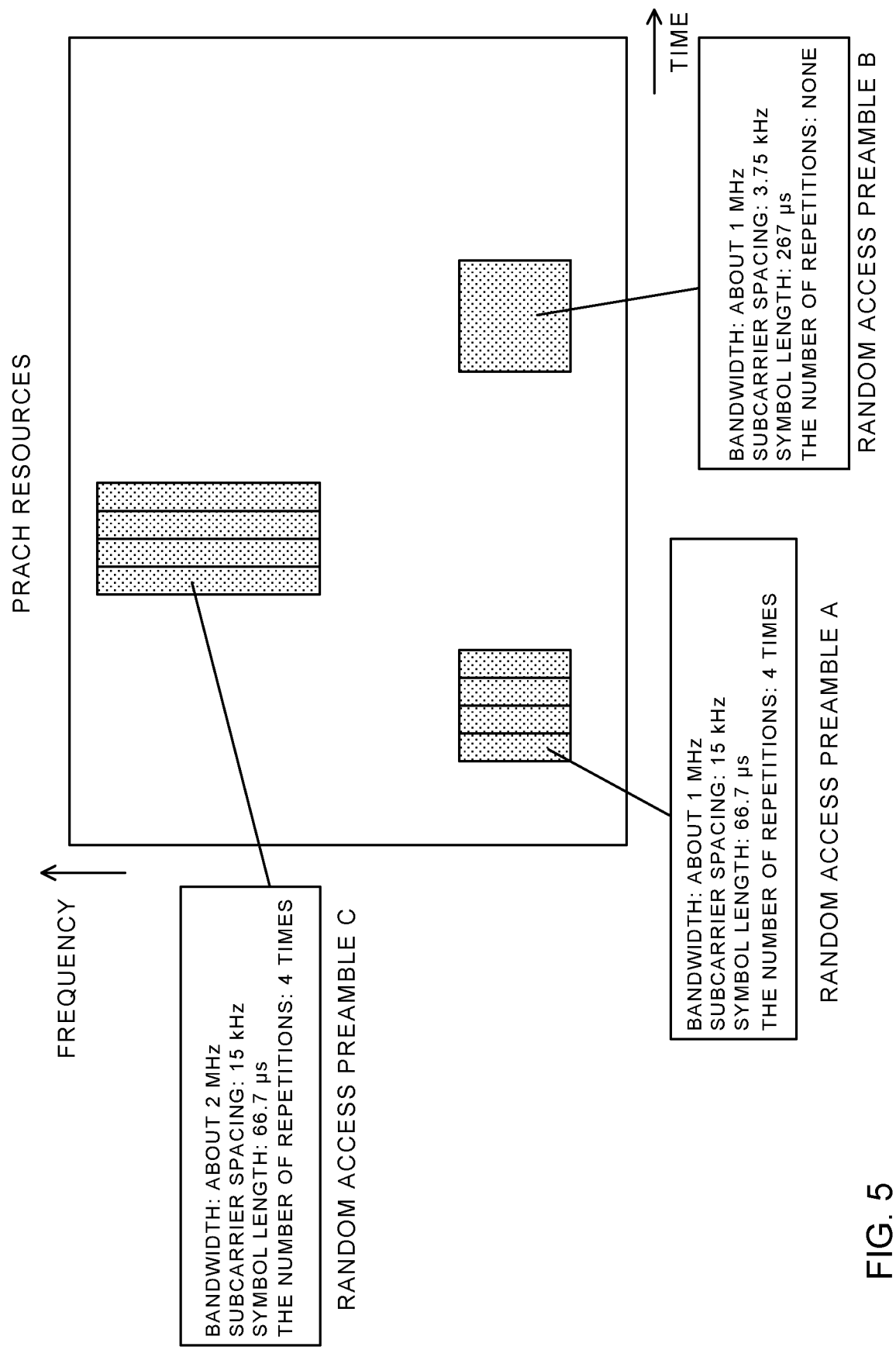
FIG. 5 is a diagram showing a multiple example of random access preambles.

In one aspect the present invention, as in FIG. 5, it is possible to time multiplex or frequency multiplex a plurality of random access preambles with different subcarrier spacings. For example, FIG. 5 illustrates the case of multiplexing a random access preamble A with a bandwidth of about 1 MHz, subcarrier spacing of 15 kHz, symbol length of 66.7 µs, and the number of repetitions is 4, a random access preamble B with a bandwidth of about 1 MHz, subcarrier spacing of 3.75 kHz, symbol length of 267 µs, and no repetitions, and a random access preamble C with a bandwidth of about 2 MHz, subcarrier spacing of 15 kHz, symbol length of 66.7 µs, and the number of repetitions is 4.

In FIG. 5, the random access preamble A and random access preamble B are time multiplexed, and the random access preambles A, B and the random access preamble C are time and frequency multiplexed. Thus, by time multiplexing and/or frequency multiplexing a plurality of random access preambles, it is possible to suppress collisions between user terminals that transmit random access preambles with different configurations. In addition, the multiplexing of random access preambles is not limited to the example shown in FIG. 5, and is capable of being set as appropriate.

(Radio Communication System)

A configuration of a radio communication system according to this Embodiment will be described below. In the radio communication system, the radio communication method according to each of the above-mentioned Aspects is applied. In addition, the radio communication method according to each of the above-mentioned Aspects may be used alone or may be used in combination thereof.

Figure 6:
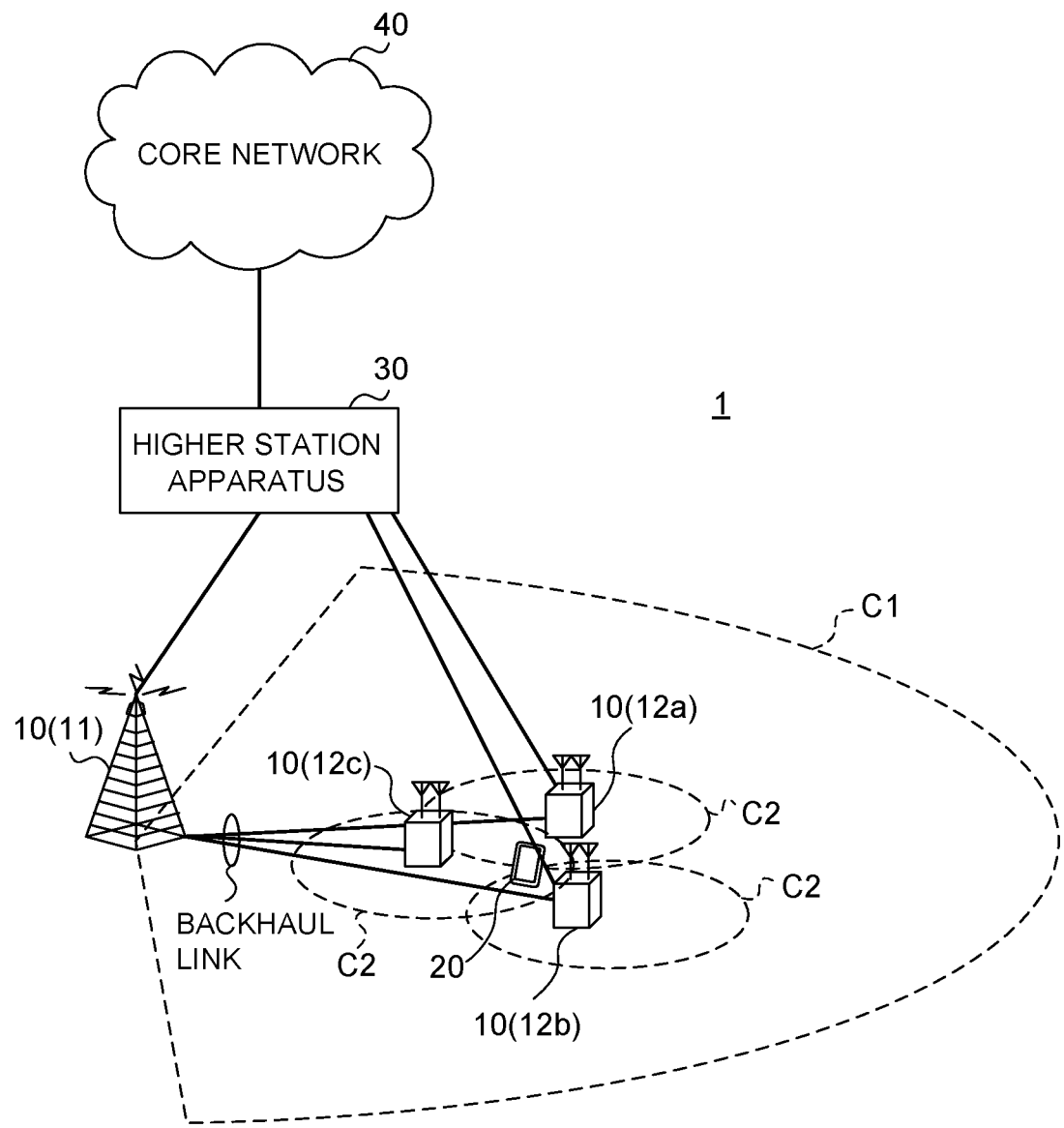
FIG. 6 is a schematic configuration diagram of a radio communication system according to this Embodiment.

FIG. 6 is a diagram showing one example of a schematic configuration of the radio communication system according to this Embodiment. In the radio communication system 1, it is possible to apply carrier aggregation (CA) to aggregate a plurality of base frequency blocks (component carriers) with a system bandwidth (e.g. 20 MHz) of the LTE system as one unit and/or dual connectivity (DC). In addition, the radio communication system 1 may be called SUPER 3G, LTE-A (LTE-Advanced), IMT-Advanced, 4G, 5G, FRA (Future Radio Access), NR (New Rat) and the like.

The radio communication system 1 shown in FIG. 6 is provided with a radio base station 11 for forming a macrocell C1, and radio base stations 12a to 12c disposed inside the macrocell C1 to form small cells C2 narrower than the macrocell C1. Further, a user terminal 20 is disposed in the macrocell C1 and each of the small cells C2. Such a configuration may be made that different numerology is applied between cells. In addition, the numerology refers to design of a signal in some RAT, and a set of communication parameters featuring design of RAT.

The user terminal 20 is capable of connecting to both the radio base station 11 and the radio base station 12. The user terminal 20 is assumed to concurrently use the macrocell C1 and small cell C2 using different frequencies by CA or DC. Further, the user terminal 20 is capable of applying CA or DC using a plurality of cells (CCs) (e.g., two or more CCs). Furthermore, the user terminal is capable of using a licensed band CC and an unlicensed band CC as a plurality of cells. In addition, it is possible to make a configuration where one of a plurality of cells includes TDD carriers to apply reduced TTI.

The user terminal 20 and radio base station 11 are capable of communicating with each other using carriers (called the existing carrier, Legacy carrier and the like) with a narrow bandwidth in a relatively low frequency band (e.g., 2 GHz). On the other hand, the user terminal 20 and radio base station 12 may use carriers with a wide bandwidth in a relatively high frequency band (e.g., 3.5 GHz, 5 GHz, 30-70 GHZ and the like), or may use the same carrier as in the radio base station 11. In addition, the configuration of the frequency band used in each radio base station is not limited thereto.

It is possible to configure so that the radio base station 11 and radio base station 12 (or, two radio base stations 12) undergo wired connection (e.g., optical fiber in conformity with CPRI (Common Public Radio Interface), X2 interface and the like), or wireless connection.

The radio base station 11 and each of the radio base stations 12 are relatively connected to an upper station apparatus 30, and are connected to a core network 40 via the upper station apparatus 30. In addition, for example, the upper station apparatus 30 includes an access gateway apparatus, Radio Network Controller (RNC), Mobility Management Entity (MME) and the like, but is not limited thereto. Further, each of the radio base stations 12 may be connected to the upper station apparatus 30 via the radio base station 11.

In addition, the radio base station 11 is a radio base station having relatively wide coverage, and may be called a macro base station, collection node, eNB (eNodeB), transmission/reception point and the like. Further, the radio base station 12 is a radio base station having local coverage, and may be called a small base station, micro-base station, pico-base station, femto-base station, HeNB (Home eNodeB), RRH (Remote Radio Head), transmission/reception point and the like. Hereinafter, in the case of not distinguishing between the radio base stations 11 and 12, the stations are collectively called a radio base station 10.

Each user terminal 20 is a terminal supporting various communication schemes such as LTE and LTE-A, and may include a fixed communication terminal, as well as the mobile communication terminal.

In the radio communication system 1, as radio access schemes, it is possible to apply OFDMA (Orthogonal Frequency Division Multiple Access) on downlink (DL), and it is possible to apply SC-FDMA (Single Carrier-Frequency Division Multiple Access) on uplink (UL). OFDMA is a multicarrier transmission scheme for dividing a frequency band into a plurality of narrow frequency bands (subcarriers), and mapping data to each subcarrier to perform communication. SC-FDMA is a single-carrier transmission scheme for dividing a system bandwidth into bands comprised of a single or contiguous resource blocks for each terminal so that a plurality of terminals uses mutually different bands, and thereby reducing interference among terminals. In addition, uplink and downlink radio access schemes are not limited to the combination of the schemes, and OFDMA may be used on UL.

As DL channels, in the radio communication system 1 are used a DL data channel (PDSCH: Physical Downlink Shared Channel, also referred to as a DL shared channel and the like) shared by user terminals 20, broadcast channel (PBCH: Physical Broadcast Channel), L1/L2 control channels and the like. User data, higher layer control information, SIB (System Information Block) and the like are transmitted on the PDSCH. Further, MIB (Master Information Block) is transmitted on the PBCH.

The L1/L2 control channel includes DL control channels (PDCCH (Physical Downlink Control Channel), EPDCCH (Enhanced Physical Downlink Control channel)), PCFICH (Physical Control Format Indicator Channel), PHICH (Physical Hybrid-ARQ Indicator Channel) and the like. Downlink control information (DCI) including scheduling information of the PDSCH and PUSCH and the like is transmitted on the PDCCH. The number of OFDM symbols used in the PDCCH is transmitted on the PCFICH. The EPDCCH is frequency division multiplexed with the PDSCH to be used in transmitting the DCI and the like as the PDCCH. It is possible to transmit retransmission instruction information (ACK/NACK) of HARQ for the PUSCH on at least one of the PHICH, PDCCH and EPDCCH.

As UL channels, in the radio communication system 1 are used a UL data channel (PUSCH: Physical Uplink Shared Channel, also referred to as a UL shared channel and the like) shared by user terminals 20, UL control channel (PUCCH: Physical Uplink Control Channel), random access channel (PRACH: Physical Random Access Channel) and the like. User data and higher layer control information is transmitted on the PUSCH. Uplink control information (UCI) including at least one of retransmission instruction information (ACK/NACK), channel state information (CSI) and the like is transmitted on the PUSCH or the PUCCH. It is possible to transmit the random access preamble to establish connection with the cell on the PRACH.

<Radio Base Station>

Figure 7:
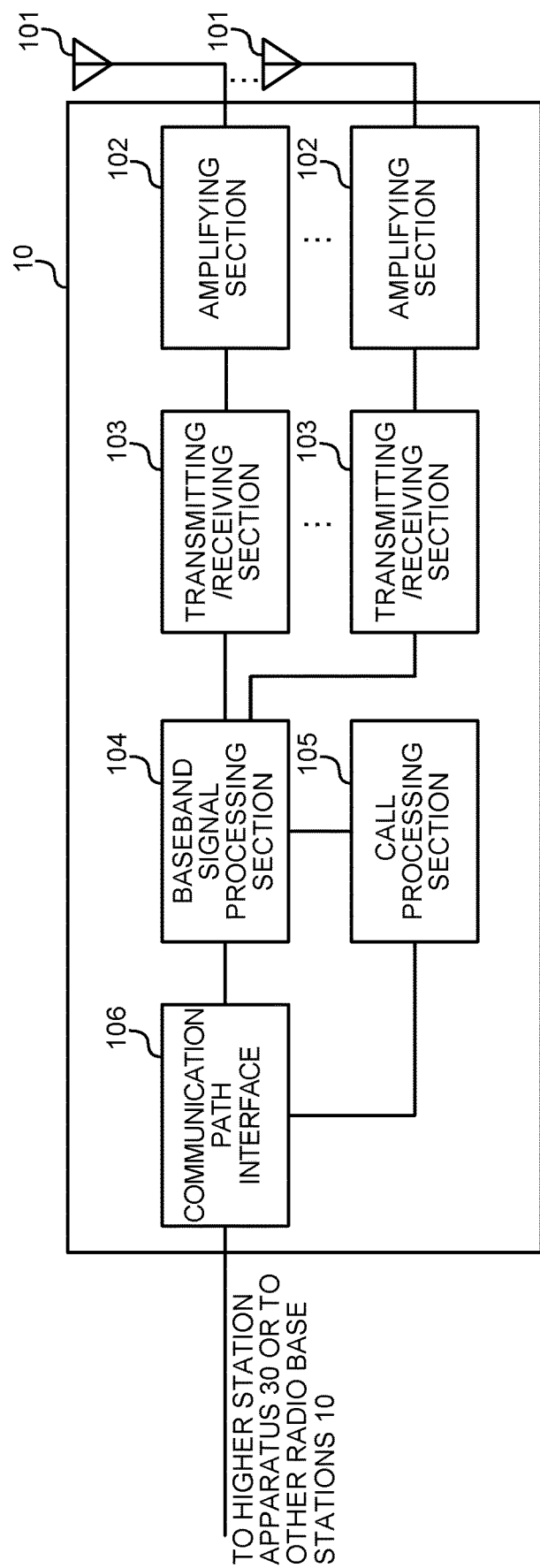
FIG. 7 is a diagram showing one example of an entire configuration of a radio base station according to this Embodiment.

FIG. 7 is a diagram showing one example of an entire configuration of the radio base station according to this Embodiment. In the radio base station, predetermined numerology is applied. The radio base station 10 is provided with a plurality of transmission/reception antennas 101, amplifying sections 102, transmission/reception sections 103, baseband signal processing section 104, call processing section 105, and transmission path interface 106. In addition, with respect to each of the transmission/reception antenna 101, amplifying section 102, and transmission/reception section 103, the radio base station may be configured to include at least one or more.

UL data to transmit to the user terminal 20 from the radio base station 10 is input to the baseband signal processing section 104 from the upper station apparatus 30 via the transmission path interface 106.

The baseband signal processing section 104 performs, on the DL data, transmission processing such as processing of PDCP (Packet Data Convergence Protocol) layer, segmentation and concatenation of the user data, transmission processing of RLC (Radio Link Control) layer such as RLC retransmission control, MAC (Medium Access Control) retransmission control (e.g., transmission processing of HARQ), scheduling, transmission format selection, channel coding, Inverse Fast Fourier Transform (IFFT) processing, and precoding processing to transfer to the transmission/ reception sections 103. Further, also concerning a DL control signal, the section 104 performs transmission processing such as channel coding and Inverse Fast Fourier Transform on the signal to transfer to the transmission/reception sections 103.

Each of the transmission/reception sections 103 converts the baseband signal, which is subjected to precoding for each antenna and is output from the baseband signal processing section 104, into a signal with a radio frequency band to transmit. The radio-frequency signal subjected to frequency conversion in the transmission/reception section 103 is amplified in the amplifying section 102, and is transmitted from the transmission/reception antenna 101. The transmission/reception section 103 is capable of being comprised of a transmitter/receiver, transmission/reception circuit or transmission/reception apparatus explained based on common recognition in the technical field according to the present invention. In addition, the transmission/reception section 103 may be comprised as an integrated transmission/ reception section, or may be comprised of a transmission section and reception section.

On the other hand, for UL signals, radio-frequency signals received in the transmission/reception antennas 101 are amplified in the amplifying sections 102. The transmission/ reception section 103 receives the UL signal amplified in the amplifying section 102. The transmission/reception section 103 performs frequency conversion on the received signal into a baseband signal to output to the baseband signal processing section 104.

For user data included in the input UL signal, the baseband signal processing section 104 performs Fast Fourier Transform (FFT) processing, Inverse Discrete Fourier Transform (IDFT) processing, error correcting decoding, reception processing of MAC retransmission control, and reception processing of RLC layer and PDCP layer to transfer to the upper station apparatus 30 via the transmission path interface 106. The call processing section 105 performs call processing such as setting and release of a communication channel, state management of the radio base station 10, and management of radio resources.

The transmission path interface 106 transmits and receives signals to/from the upper station apparatus 30 via a predetermined interface. Further, the transmission path interface 106 may transmit and receive signals (backhaul signaling) to/from another radio base station 10 via an inter-base station interface (e.g., optical fiber in conformity with CPRI (Common Public Radio Interface), X2 interface).

In addition, the transmission/reception section 103 may further have an analog beam forming section for performing analog beam forming. The analog beam forming section is capable of being comprised of an analog beam forming circuit (e.g., phase shifter, phase shift circuit) or analog beam forming apparatus (e.g., phase shift device) explained based on the common recognition in the technical field according to the present invention. Further, for example, the transmission/reception antenna 101 is capable of being comprised of an array antenna.

In addition, the transmission/reception section 103 transmits the DL signal (e.g., DL control signal (DL control channel), DL data signal (DL data channel, DL shared channel), DL reference signal (DM-RS, CSI-RS and the like), discovery signal, synchronization signal, broadcast signal and the like), and receives the UL signal (e.g., UL control signal (UL control channel), UL data signal (UL data channel, UL shared channel), UL reference signal and the like).

Specifically, in one aspect of the present invention, the transmission/reception section 103 transmits information about numerology used by the user terminal. For example, the transmission/reception section 103 transmits information on a random access preamble used by the user terminal. As the information on the random access preamble, for example, there are bit information for identifying a format of a preamble format, information indicative of the subcarrier spacing, information indicative of the number of repetitions, and the like.

Further, at the time of random access, the transmission/ reception section 103 transmits the Message 2, Message 4, UL grant and the like to the user terminal 20. Furthermore, at the time of random access, the transmission/reception section 103 receives the random access preamble, Message 3, ACK and the like from the user terminal 20. In this case, the information on the random access preamble may be set semi-statically by higher layer signaling such as RRC (Radio Resource Control) signaling and broadcast information, or may be dynamically changed by physical layer control information (L1/L2 control channel). Alternatively, the information may be changed by combination of higher layer signaling and physical layer control information.

Moreover, the transmission/reception section 103 transmits setting information on a plurality of contention-based resource regions with different parameters by at least of system information, higher layer signaling and DL control channel. The setting information may include at least one of the number of time resources, the number of frequency resources, parameter with respect to the number of repetitions, parameter with respect to the transmission processing, parameter with respect to frequency hopping, information for identifying resource groups, parameter with respect to time and/or frequency position, numerology and parameter with respect to retransmission control for each of the contention-based resource regions.

The transmission section and reception section of the present invention are comprised of the transmission/reception section 103 and/or the transmission path interface 106.

Figure 8:
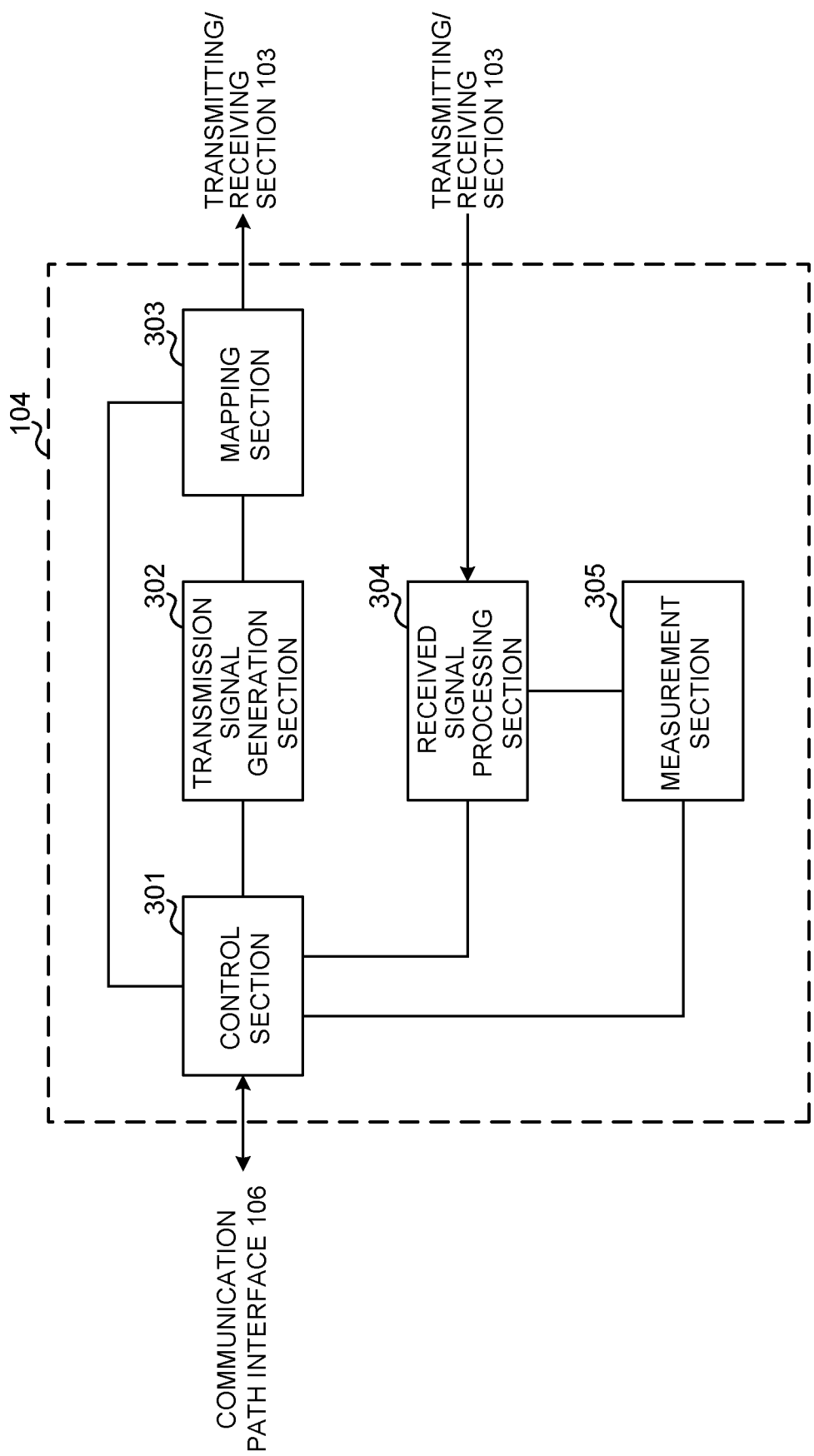
FIG. 8 is a diagram showing one example of a function configuration of the radio base station according to this Embodiment.

FIG. 8 is a diagram showing one example of a function configuration of the radio base station according to this Embodiment. In addition, FIG. 8 mainly illustrates function blocks of a characteristic portion in this Embodiment, and the radio base station 10 is assumed to have other function blocks required for radio communication. As shown in FIG. 8, the baseband signal processing section 104 is provided with at least a control section 301, transmission signal generating section 302, mapping section 303, received signal processing section 304, and measurement section 305.

The control section 301 performs control of the entire radio base station 10. The control section 301 is capable of being comprised of a controller, control circuit or control apparatus explained based on the common recognition in the technical field according to the present invention.

For example, the control section 301 controls generation of signals by the transmission signal generating section 302 and allocation of signals by the mapping section 303. Further, the control section 301 controls reception processing of signals by the received signal processing section 304 and measurement of signals by the measurement section 305.

The control section 301 controls scheduling (e.g., resource allocation) of the DL signal and/or the UL signal.

Specifically, the control section 301 controls the transmission signal generating section 302, mapping section 303 and transmission/reception section 103 so as to generate and transmit the DCI (DL assignment) including the scheduling information of the DL data channel, and the DCI (UL grant) including scheduling information of the UL data channel.

The control section 301 controls the random access procedure. In other words, the control section 301 controls the random access procedure shown in FIG. 1.

Based on instructions from the control section 301, the transmission signal generating section 302 generates DL signals (DL control channel, DL data channel, DL reference signal such as DM-RS and the like) to output to the mapping section 303. The transmission signal generating section 302 is capable of being comprised of a signal generator, signal generating circuit or signal generating apparatus explained based on the common recognition in the technical field according to the present invention.

Based on instructions from the control section 301, the mapping section 303 maps the DL signal generated in the transmission signal generating section 302 to predetermined radio resources to output to the transmission/reception section 103. The mapping section 303 is capable of being comprised of a mapper, mapping circuit or mapping apparatus explained based on the common recognition in the technical field according to the present invention.

The received signal processing section 304 performs reception processing (e.g., demapping, demodulation, decoding and the like) on the received signal input from the transmission/reception section 103. Herein, for example, the received signal is the UL signal (UL control channel, UL data channel, UL reference signal and the like) transmitted from the user terminal 20. The received signal processing section 304 is capable of being comprised of a signal processor, signal processing circuit or signal processing apparatus explained based on the common recognition in the technical field according to the present invention.

The received signal processing section 304 outputs the information decoded by the reception processing to the control section 301. For example, the received signal processing section 304 outputs at least one of control information and UL data to the control section 301. Further, the received signal processing section 304 outputs the received signal and signal subjected to the reception processing to the measurement section 305.

The measurement section 305 performs measurement on the received signal. The measurement section 305 is capable of being comprised of a measurement device, measurement circuit or measurement apparatus explained based on the common recognition in the technical field according to the present invention.

For example, the measurement section 305 may measure received power (e.g., RSRP (Reference Signal Received Power)), received quality (e.g., RSRQ (Reference Signal Received Quality)), channel state and the like of the received signal. The measurement result may be output to the control section 301.

<User Terminal>

Figure 9:
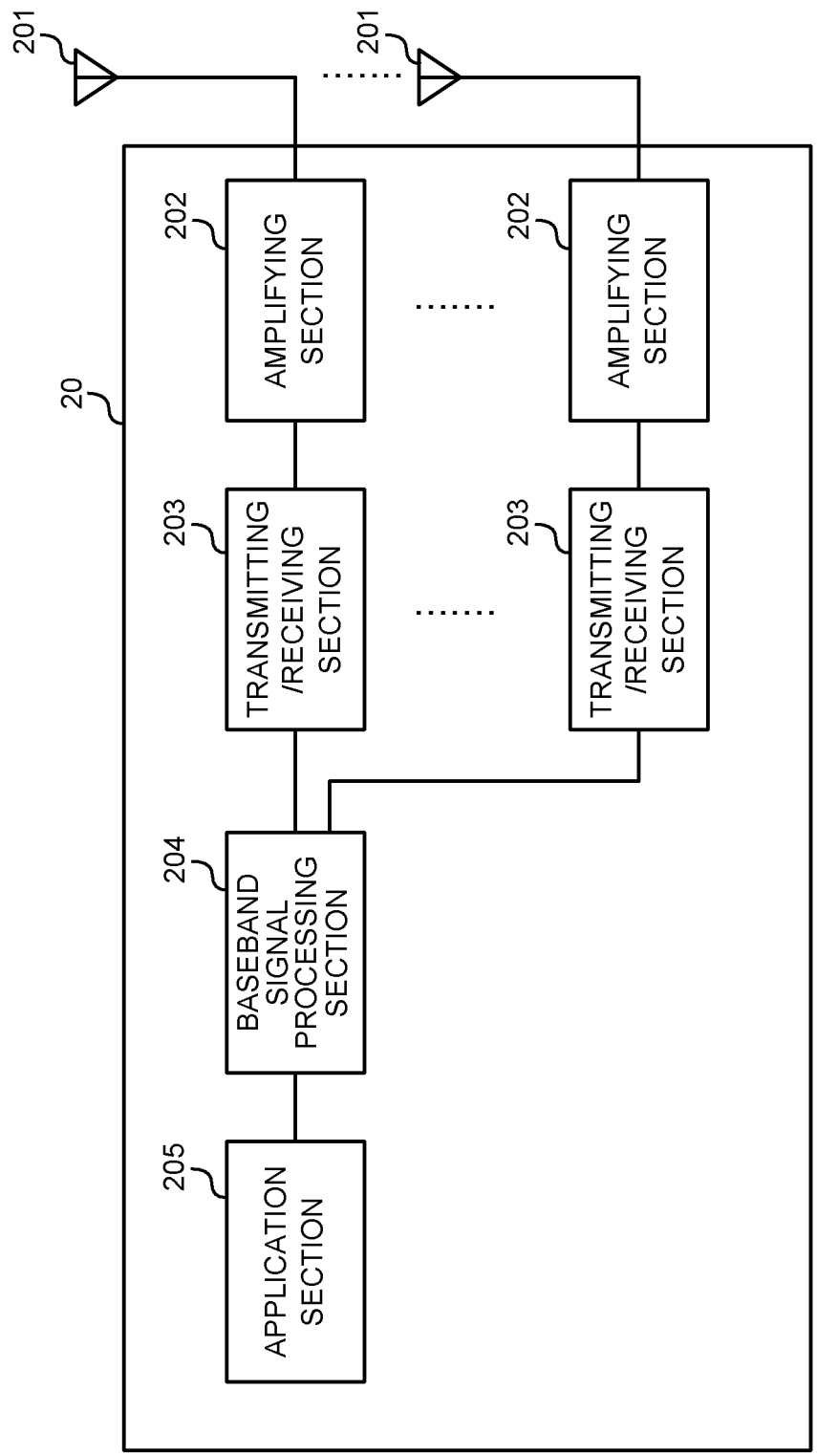
FIG. 9 is a diagram showing one example of an entire configuration of a user terminal according to this Embodiment.

FIG. 9 is a diagram showing one example of an entire configuration of the user terminal according to this Embodiment. The user terminal 20 is provided with a plurality of transmission/reception antennas 201, amplifying sections 202, transmission/reception sections 203, baseband signal processing section 204, and application section 205. In addition, with respect to each of the transmission/reception antenna 201, amplifying section 202, and transmission/reception section 203, the user terminal may be configured to include at least one or more.

Radio-frequency signals received in the transmission/reception antennas 201 are respectively amplified in the amplifying sections 202. Each of the transmission/reception sections 203 receives the DL signal amplified in the amplifying section 202. The transmission/reception section 203 performs frequency conversion on the received signal into a baseband signal to output to the baseband signal processing section 204. The transmission/reception section 203 is capable of being comprised of a transmitter/receiver, transmission/reception circuit or transmission/reception apparatus explained based on the common recognition in the technical field according to the present invention. In addition, the transmission/reception section 203 may be comprised as an integrated transmission/reception section, or may be comprised of a transmission section and reception section.

The baseband signal processing section 204 performs FFT processing, error correcting decoding, reception processing of retransmission control and the like on the input baseband signal. The DL data is transferred to the application section 205. The application section 205 performs processing concerning layers higher than the physical layer and MAC layer, and the like. Further, among the DL data, system information and higher layer control information is also transferred to the application section 205.

On the other hand, for the UL data, the data is input to the baseband signal processing section 204 from the application section 205. The baseband signal processing section 204 performs transmission processing of retransmission control (e.g., transmission processing of HARQ), channel coding, precoding, Discrete Fourier Transform (DFT) processing, IFFT processing and the like to transfer to each of the transmission/reception sections 203. Each of the transmission/reception sections 203 converts the baseband signal output from the baseband signal processing section 204 into a signal with a radio frequency band to transmit. The radio-frequency signals subjected to frequency conversion in the transmission/reception sections 203 are amplified in the amplifying sections 202, and are transmitted from the transmission/reception antennas 201, respectively.

In addition, the transmission/reception section 203 may further have an analog beam forming section for performing analog beam forming. The analog beam forming section is capable of being comprised of an analog beam forming circuit (e.g., phase shifter, phase shift circuit) or analog beam forming apparatus (e.g., phase shift device) explained based on the common recognition in the technical field according to the present invention. Further, for example, the transmission/reception antenna 201 is capable of being comprised of an array antenna.

The transmission/reception section 203 receives the DL signal (e.g., DL control signal (DL control channel), DL data signal (DL data channel, DL shared channel), DL reference signal (DM-RS, CSI-RS and the like), discovery signal, synchronization signal, broadcast signal and the like), and transmits the UL signal (e.g., UL control signal (UL control channel), UL data signal (UL data channel, UL shared channel), UL reference signal and the like).

Further, the transmission/reception section 203 transmits a random access preamble with a predetermined subcarrier spacing applied among random access preambles for supporting a plurality of subcarrier spacings.

Specifically, in one aspect of the present invention, the transmission/reception section 203 receives information about numerology used by the user terminal. For example, the transmission/reception section 203 receives information on the random access preamble used by the user terminal. As the information on the random access preamble, for example, there are the bit information for identifying a format of a preamble format, information indicative of the subcarrier spacing, information indicative of the number of repetitions, and the like. Further, at the time of random access, the transmission/reception section 203 receives the Message 2, Message 4, UL grant and the like from the user terminal 20. Furthermore, at the time of random access, the transmission/reception section 203 transmits the random access preamble, Message 3, ACK and the like to the user terminal 20. In this case, the transmission/reception section 203 may transmit the random access preamble repeatedly.

Further, the transmission/reception section 203 receives setting information on a plurality of contention-based resource regions with different parameters by at least of system information, higher layer signaling and DL control channel. The setting information may include at least one of the number of time resources, the number of frequency resources, parameter with respect to the number of repetitions, parameter with respect to the transmission processing, parameter with respect to frequency hopping, parameter with respect to the preamble, information for identifying resource groups, parameter with respect to time and/or frequency posit ion, numerology and parameter with respect to retransmission control for each of the contention-based resource regions.

As shown in FIG. 4A, in the case of applying analog beam forming for changing directivity of the beam for each symbol to the random access preamble, the transmission/reception section 203 performs the analog beam forming processing after RF processing on the signal.

Figure 10:
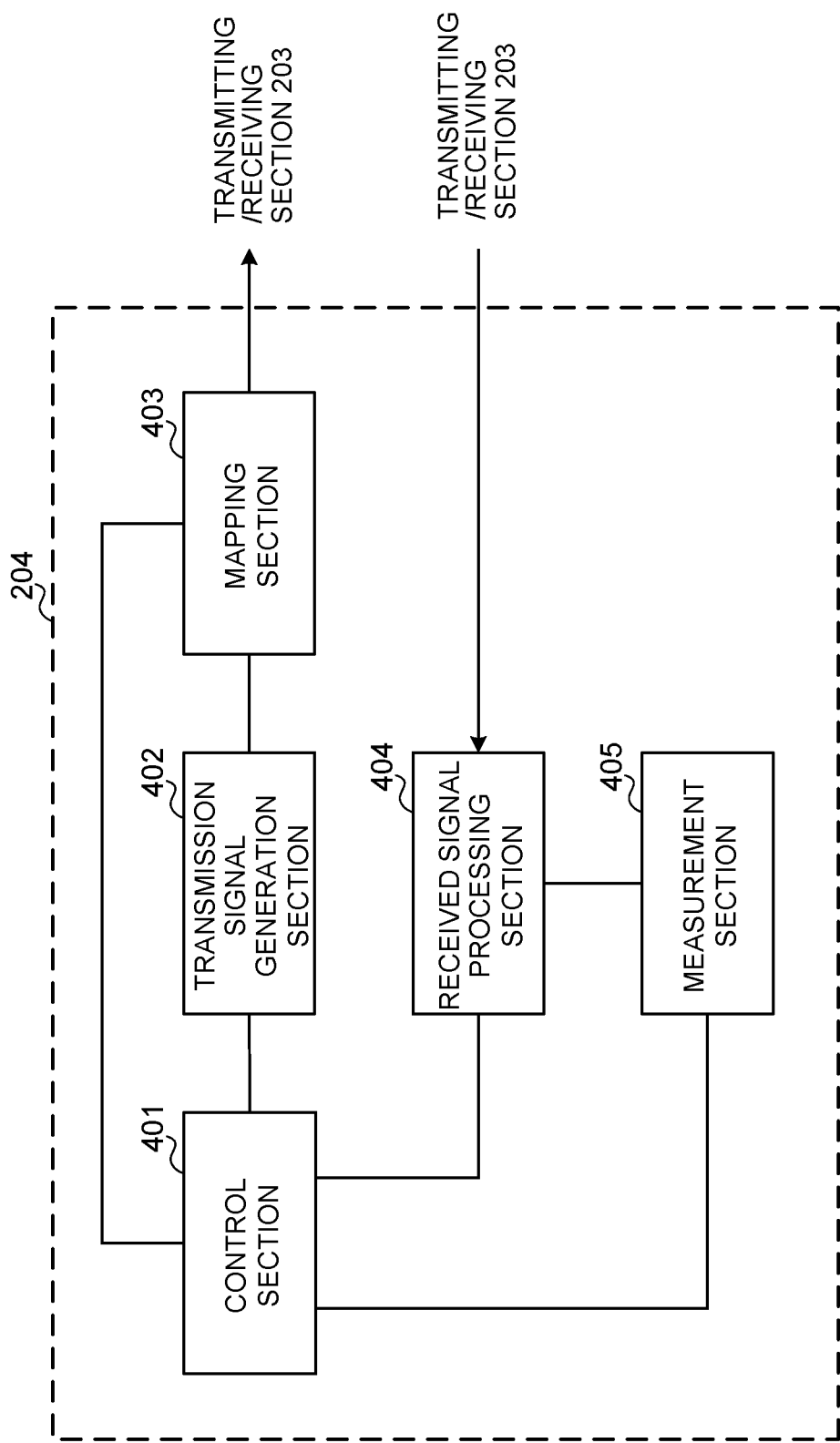
FIG. 10 is a diagram showing one example of a function configuration of the user terminal according to this Embodiment.

FIG. 10 is a diagram showing one example of a function configuration of the user terminal according to this Embodiment. In addition, FIG. 10 mainly illustrates function blocks of a characteristic portion in this Embodiment, and the user terminal 20 is assumed to have other function blocks required for radio communication. As shown in FIG. 10, the baseband signal processing section 204 that the user terminal 20 has is provided with at least a control section 401, transmission signal generating section 402, mapping section 403, received signal processing section 404, and measurement section 405.

The control section 401 performs control of the entire user terminal 20. The control section 401 is capable of being comprised of a controller, control circuit or control apparatus explained based on the common recognition in the technical field according to the present invention.

For example, the control section 401 controls generation of signals by the transmission signal generating section 402 and allocation of signals by the mapping section 403. Further, the control section 401 controls reception processing of signals by the received signal processing section 404 and measurement of signals by the measurement section 405.

The control section 401 acquires the DL control channel and DL data channel transmitted from the radio base station 10 from the received signal processing section 404. Specifically, the control section 401 controls the transmission/reception section 203 and received signal processing section 404 so as to perform blind decoding on the DL control channel to detect the DCI, and based on the DCI, receive the DL data channel. Further, the control section 401 estimates channel gain based on the DL reference signal, and based on the estimated channel gain, demodulates the DL data channel.

Based on a result obtained by judging necessity of retransmission control to the DL data channel and the like, the control section 401 may control transmission of retransmission control information (e.g., HARQ-ACK and the like) transmitted on the UL control channel or the UL data channel. Further, the control section 401 may control transmission of channel state information (CSI) generated based on the DL reference signal.

In one aspect of the present invention, the control section 401 selects a random access preamble with a predetermined subcarrier spacing applied from among random access preambles for supporting a plurality of subcarrier spacings. In this case, based on a predetermined condition such as the type of numerology, SNR and shift speed, the control section 401 selects the random access preamble with the predetermined subcarrier spacing applied. Specifically, as shown in FIGS. 3A and 3B, the control section 401 selects the random access preamble with the predetermined subcarrier spacing applied. Further, the control section 401 sets the random access preamble for a beforehand defined bandwidth.

Based on instructions from the control section 401, the transmission signal generating section 402 generates UL signals (UL control channel, UL data channel, UL reference signal and the like) to output to the mapping section 403. The transmission signal generating section 402 is capable of being comprised of a signal generator, signal generating circuit or signal generating apparatus explained based on the common recognition in the technical field according to the present invention.

Based on instructions from the control section 401, the transmission signal generating section 402 generates the UL data channel. For example, when the DL control channel notified from the radio base station 10 includes a UL grant, the transmission signal generating section 402 is instructed to generate the UL data channel from the control section 401.

Based on instructions from the control section 401, the mapping section 403 maps the UL signal generated in the transmission signal generating section 402 to radio resources to output to the transmission/reception section 203. The mapping section 403 is capable of being comprised of a mapper, mapping circuit or mapping apparatus explained based on the common recognition in the technical field according to the present invention.

As shown in FIG. 5, the mapping section 403 maps the random access preamble to radio resources. Specifically, as shown in FIG. 5, the mapping section 403 time multiplexes and/or frequency multiplexes the random access preamble into radio resources to perform mapping.

The received signal processing section 404 performs reception processing (e.g., demapping, demodulation, decoding and the like) on the received signal input from the transmission/reception section 203. Herein, for example, the received signal is the DL signal (DL control channel, DL data channel, DL reference signal and the like) transmitted from the radio base station 10. The received signal processing section 404 is capable of being comprised of a signal processor, signal processing circuit or signal processing apparatus explained based on the common recognition in the technical field according to the present invention.

Based on instructions from the control section 401, the received signal processing section 404 performs blind decoding on the DL control channel for scheduling transmission and/or reception the DL data channel, and based on the DCI, performs the reception processing of the DL data channel. Further, the received signal processing section 404 estimates channel gain based on the DM-RS or CRS, and based on the estimated channel gain, demodulates the DL data channel.

The received signal processing section 404 outputs the information decoded by the reception processing to the control section 401. For example, the received signal processing section 404 outputs the broadcast information, system information, RRC signaling, DCI and the like to the control section 401. The received signal processing section 404 may output a decoding result of the data to the control section 401. Further, the received signal processing section 404 outputs the received signal and signal subjected to the reception processing to the measurement section 405.

The measurement section 405 performs measurement on the received signal. The measurement section 405 is capable of being comprised of a measurement device, measurement circuit or measurement apparatus explained based on the common recognition in the technical field according to the present invention.

For example, the measurement section 405 may measure received power (e.g., RSRP), DL received quality (e.g., RSRQ), channel state and the like of the received signal. The measurement result may be output to the control section 401.

<Hardware Configuration>

In addition, the block diagrams used in explanation of the above-mentioned Embodiment show blocks on a function-by-function basis. These function blocks (configuration sections) are actualized by any combination of hardware and/or software. Further, the means for actualizing each function block is not limited particularly. In other words, each function block may be actualized by a single apparatus combined physically and/or logically, or two or more apparatuses that are separated physically and/or logically are connected directly and/or indirectly (e.g. by cable and/or radio), and each function block may be actualized by a plurality of these apparatuses.

Figure 11:
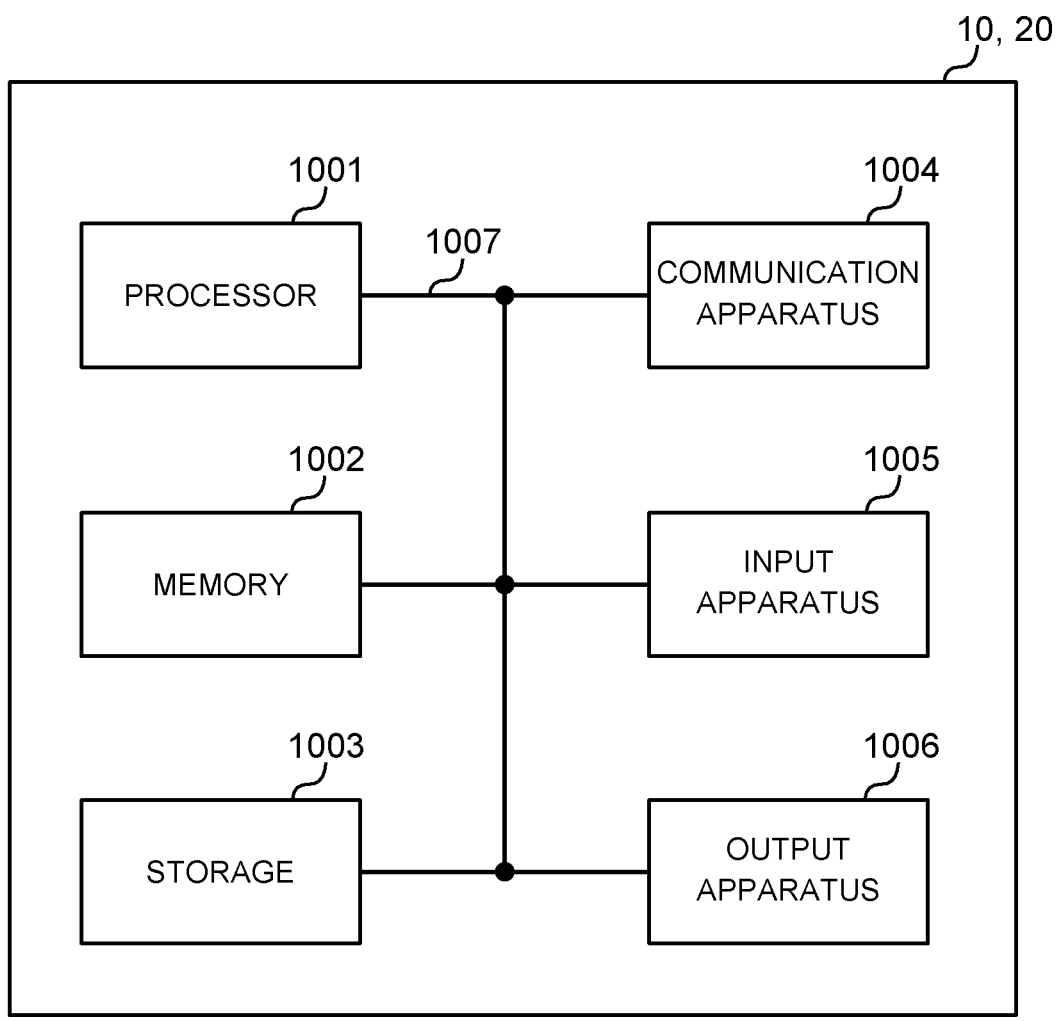
FIG. 11 is a diagram showing one example of hardware configurations of the radio base station and user terminal according to this Embodiment.

For example, each of the radio base station, user terminal and the like in this Embodiment may function as a computer that performs the processing of the radio communication method of the present invention. FIG. 11 is a diagram showing one example of a hardware configuration of each of the radio base station and user terminal according to this Embodiment. Each of the radio base station 10 and user terminal 20 as described above may be physically configured as a computer apparatus including a processor 1001, memory 1002, storage 1003, communication apparatus 1004, input apparatus 1005, output apparatus 1006, bus 1007 and the like.

In addition, in the following description, it is possible to replace the letter of "apparatus" with a circuit, device, unit and the like to read. With respect to each apparatus shown in the figure, the hardware configuration of each of the radio base station 10 and the user terminal 20 may be configured so as to include a single or a plurality, or may be configured without including a part of apparatuses.

For example, a single processor 1001 is shown in the figure, but a plurality of processors may exist. Further, the processing may be executed by a single processor, or may be executed by one or more processors at the same time, sequentially or by another technique. In addition, the processor 1001 may be implemented on one or more chips.

For example, each function in the radio base station 10 and user terminal 20 is actualized in a manner such that predetermined software (program) is read on the hardware of the processor 1001, memory 1002 and the like, and that the processor 1001 thereby performs computations, and controls communication by the communication apparatus 1004, and read and/or write of data in the memory 1002 and storage 1003.

For example, the processor 1001 operates an operating system to control the entire computer. The processor 1001 may be comprised of a Central Processing Unit (CPU) including interfaces with peripheral apparatuses, control apparatus, computation apparatus, register and the like. For example, the above-mentioned baseband signal processing section 104 (204), call processing apparatus 105 and the like may be actualized by the processor 1001.

Further, the processor 1001 reads the program (program code), software module, data and the like on the memory 1002 from the storage 1003 and/or the communication apparatus 1004, and according thereto, executes various kinds of processing. Used as the program is a program that causes the computer to execute at least apart of operation described in the above-mentioned Embodiment. For example, the control section 401 of the user terminal 20 may be actualized by a control program stored in the memory 1002 to operate in the processor 1001, and the other function blocks may be actualized similarly.

The memory 1002 is a computer-readable storage medium, and for example, may be comprised of at least one of ROM (Read Only Memory), EPROM (Erasable Programmable ROM), EEPROM (Electrically EPROM), RAM (Random Access Memory) and other proper storage media. The memory 1002 may be called the register, cache, main memory (main storage apparatus) and the like. The memory 1002 is capable of storing the program (program code), software module and the like executable to implement the radio communication method according to one Embodiment of the present invention.

The storage 1003 is a computer-readable storage medium, and for example, may be comprised of at least one of a flexible disk, floppy (Registered Trademark) disk, magneto-optical disk (e.g. compact disk (CD-ROM (Compact Disc ROM), etc.), digital multi-purpose disk, Blu-ray (Registered Trademark) disk), removable disk, hard disk drive, smart card, flash memory device (e.g. card, stick, key drive), magnetic stripe, database, server and other proper storage media. The storage 1003 may be called an auxiliary storage apparatus.

The communication apparatus 1004 is hardware (transmission/reception device) to perform communication between computers via a wired and/or wireless network, and for example, is also referred to as a network device, network controller, network card, communication module and the like. For example, in order to actualize Frequency Division Duplex (FDD) and/or Time Division Duplex (TDD), the communication apparatus 1004 may be comprised by including a high-frequency switch, duplexer, filter, frequency synthesizer and the like. For example, the transmission/reception antenna 101 (201), amplifying section 102 (202), transmission/reception section 103 (203), transmission path interface 106 and the like as described above may be actualized by the communication apparatus 1004.

The input apparatus 1005 is an input device (e.g., keyboard, mouse, microphone, switch, button, sensor and the like) that receives input from the outside. The output apparatus 1006 is an output device (e.g., display, speaker, LED (Light Emitting Diode) lamp and the like) that performs output to the outside. In addition, the input apparatus 1005 and output apparatus 1006 may be an integrated configuration (e.g. touch panel).

Further, each apparatus of the processor 1001, memory 1002 and the like is connected on the bus 1007 to communicate information. The bus 1007 may be comprised of a single bus, or may be comprised of different buses between apparatuses.

Furthermore, each of the radio base station 10 and user terminal 20 may be configured by including hardware such as a microprocessor, Digital Signal Processor (DSP), ASIC (Application Specific Integrated Circuit), PLD (Programmable Logic Device), and FPGA (Field Programmable Gate Array), or apart or the whole of each function block may be actualized by the hardware. For example, the processor 1001 may be implemented by at least one of the hardware.

(Modification)

In addition, the term explained in the present Description and/or the term required to understand the present Description may be replaced with a term having the same or similar meaning. For example, the channel and/or the symbol may be a signal (signaling). Further, the signal may be a message. The reference signal is capable of being abbreviated as RS (Reference Signal), and according to the standard to apply, may be called a pilot, pilot signal and the like. Furthermore, the component carrier (CC) may be called a cell, frequency carrier, carrier frequency and the like.

Further, the radio frame may be comprised of a single or a plurality of frames in the time domain. The single or each of the plurality of frames constituting the radio frame may be called a subframe. Furthermore, the subframe may be comprised of a single or a plurality of slots in the time domain. Still furthermore, the slot may be comprised of a single or a plurality of symbols (OFDM (Orthogonal Frequency Division Multiplexing) symbol, SC-FDMA (Single Carrier Frequency Division Multiple Access) symbol and the like) in the time domain.

Each of the radio frame, subframe, slot and symbol represents a time unit in transmitting a signal. For the radio frame, subframe, slot and symbol, another name corresponding to each of them may be used. For example, one subframe may be called Transmission Time Interval (TTI), a plurality of contiguous subframes may be called TTI, or one slot may be called TTI. In other words, the subframe and TTI may be the subframe (1 ms) in the existing LTE, may be a frame (e.g. 1 to 13 symbols) shorter than 1 ms, or may be a frame longer than 1 ms.

Herein, for example, the TTI refers to a minimum time unit of scheduling in radio communication. For example, in the LTE system, the radio base station performs scheduling for allocating radio resources (frequency bandwidth, transmit power and the like capable of being used in each user terminal) to each user terminal in a TTI unit. In addition, the definition of the TTI is not limited thereto. The TTI may be a transmission time unit of a data packet (transport block) subjected to channel coding, or may be a processing unit of scheduling, link adaptation and the like.

The TTI having a time length of 1 ms may be called ordinary TTI (TTI in LTE Rel. 8-12), normal TTI, long TTI, ordinary subframe, normal subframe, long subframe or the like. TTI shorter than the ordinary TTI may be called reduced TTI, short TTI, reduced subframe, short subframe or the like.

The resource block (RB) is a resource allocation unit in the time domain and frequency domain, and may include a single or a plurality of contiguous subcarriers in the frequency domain. Further, the RB may include a single or a plurality of symbols in the time domain, and may have a length of 1 slot, 1 subcarrier, or 1 TTI. Each of 1 TTI and 1 subframe may be comprised of a single or a plurality of resource blocks. In addition, the RB may be called a physical resource block (PRB: Physical RB)), PRB pair, RB pair and the like.

Further, the resource block may be comprised of a single or a plurality of resource elements (RE: Resource Element). For example, 1 RE may be a radio resource region of 1 subcarrier and 1 symbol.

In addition, structures of the above-mentioned radio frame, subframe, slot, symbol and the like are only illustrative. For example, it is possible to modify, in various manners, configurations of the number of subframes included in the radio frame, the number of slots included in the subframe, the numbers of symbols and RBs included in the slot, the number of subcarriers included in the RB, the number of symbols within the TTI, the symbol length, the cyclic prefix (CP) length and the like.

Further, the information, parameter and the like explained in the present Description may be expressed by an absolute value, may be expressed by a relative value from a predetermined value, or may be expressed by another corresponding information. For example, the radio resource may be indicated by a predetermined index. Further, equations using these parameters and the like may be different from those explicitly disclosed in the present Description.

The names used in the parameter and the like in the present Description are not restrictive in any respects. For example, it is possible to identify various channels (PUCCH (Physical Uplink Control Channel), PDCCH (Physical Downlink Control Channel) and the like) and information elements, by any suitable names, and therefore, various names assigned to these various channels and information elements are not restrictive in any respects.

The information, signal and the like explained in the present Description may be represented by using any of various different techniques. For example, the data, order, command, information, signal, bit, symbol, chip and the like capable of being described over the entire above-mentioned explanation may be represented by voltage, current, electromagnetic wave, magnetic field or magnetic particle, optical field or photon, or any combination thereof.

Further, the information, signal and the like are capable of being output from a higher layer to a lower layer, and/or from the lower layer to the higher layer. The information, signal and the like may be input and output via a plurality of network nodes.

The input/output information, signal and the like may be stored in a particular place (e.g., memory), or may be managed with a management table. The input/output information, signal and the like are capable of being rewritten, updated or edited. The output information, signal and the like may be deleted. The input information, signal and the like may be transmitted to another apparatus.

Notification of the information is not limited to the Aspect/Embodiment described in the present Description, and may be performed by another method. For example, notification of the information may be performed using physical layer signaling (e.g., Downlink Control Information (DCI), Uplink Control Information (UCI)), higher layer signaling (e.g., RRC (Radio Resource Control) signaling, broadcast information (Master Information Block (MIB), System Information Block (SIB) and the like), MAC (Medium Access Control) signaling), other signals, or combination thereof.

In addition, physical layer signaling may be called L1/L2 (Layer 1/Layer 2) control information (L1/L2 control signal), L1 control information (L1 control signal) and the like. Further, RRC signaling may be called RRC message, and for example, may be RRC Connection Setup message, RRC Connection Reconfiguration message and the like. Furthermore, for example, MAC signaling may be notified by MAC Control Element (MAC CE).

Further, notification of predetermined information (e.g., notification of "being X") is not limited to notification that is performed explicitly, and may be performed implicitly (e.g., notification of the predetermined information is not performed, or by notification of different information).

The decision may be made with a value ("0" or "1") expressed by 1 bit, may be made with a Boolean value represented by true or false, or may be made by comparison with a numerical value (e.g., comparison with a predetermined value).

Irrespective of that the software is called software, firmware, middle-ware, micro-code, hardware descriptive term, or another name, the software should be interpreted widely to mean a command, command set, code, code segment, program code, program, sub-program, software module, application, software application, software package, routine, sub-routine, object, executable file, execution thread, procedure, function and the like.

Further, the software, command, information and the like may be transmitted and received via a transmission medium. For example, when the software is transmitted from a website, server or another remote source using wired techniques (coaxial cable, optical fiber cable, twisted pair, Digital Subscriber Line (DSL) and the like) and/or wireless techniques (infrared, microwave and the like), these wired techniques and/or wireless techniques are included in the definition of the transmission medium.

The terms of "system" and "network" used in the present Description are used interchangeably.

In the present Description, the terms of "Base Station (BS)", "radio base station", "eNB", "cell", "sector", "cell group", "carrier" and "component carrier" are capable of being used interchangeably. There is the case where the base station is called by the terms of fixed station, NodeB, eNodeB (eNB), access point, transmission point, reception point, femto-cell, small cell and the like.

The base station is capable of accommodating a single or a plurality of (e.g., three) cells (also called the sector). When the base station accommodates a plurality of cells, the entire coverage area of the base station is capable of being divided into a plurality of smaller areas, and each of the smaller areas is also capable of providing communication services by a base station sub-system (e.g., small base station (RRH: Remote Radio Head) for indoor use). The term of "cell" or "sector" refers to a part or the whole of coverage area of the base station and/or base station sub-system that performs communication services in the coverage.

In the present Description, the terms of "Mobile Station (MS)", "user terminal", "User Equipment (UE)", and "terminal" are capable of being used interchangeably. There is the case where the base station is called by the terms of fixed station, NodeB, eNodeB (eNB), access point, transmission point, reception point, femto-cell, small cell and the like.

There is the case where the Mobile Station may be called using a subscriber station, mobile unit, subscriber unit, wireless unit, remote unit, mobile device, wireless device, wireless communication device, remote device, mobile subscriber station, access terminal, mobile terminal, wireless terminal, remote terminal, handset, user agent, mobile client, client, or some other suitable terms, by the person skilled in the art.

Further, the radio base station in the present Description may be read with the user terminal. For example, each Aspect/Embodiment of the present invention may be applied to a configuration where communication between the radio base station and the user terminal is replaced with communication among a plurality of user terminals (D2D: Device-to-Device). In this case, the functions that the above-mentioned radio base station 10 has may be the configuration that the user terminal 20 has. Further, the words of "up", "down" and the like may be read with "side". For example, the uplink channel may be read with a side channel.

Similarly, the user terminal in the present Description may be read with the radio base station. In this case, the functions that the above-mentioned user terminal 20 has may be the configuration that the radio base station 10 has.

In the present Description, particular operation performed by the base station may be performed by the upper node in some case. In a network comprised of a single or a plurality of network nodes having the base station, it is obvious that various operations performed for communication with the terminal are performed by the base station, one or more network nodes (e.g., MME (Mobility Management Entity), S-GW (Serving-Gateway) and the like are considered, but the invention is not limited thereto) except the base station, or combination thereof.

Each Aspect/Embodiment explained in the present Description may be used alone, may be used in combination, or may be switched and used according to execution. Further, with respect to the processing procedure, sequence, flowchart and the like of each Aspect/Embodiment explained in the present Description, unless there is a contradiction, the order may be changed. For example, with respect to the methods explained in the present Description, elements of various steps are presented in illustrative order, and are not limited to the presented particular order.

Each Aspect/Embodiment explained in the present Description may be applied to LTE (Long Term Evolution), LTE-A (LTE-Advanced), LTE-B (LTE-Beyond), SUPER 3G, IMT-Advanced, 4G (4th generation mobile communication system), 5G (5th generation mobile communication system), FRA (Future Radio Access), New-RAT (Radio Access Technology), NR (New Radio), NX (New radio access), FX (Future generation radio access), GSM (Registered Trademark) (Global System for Mobile communications), CDMA 2000, UMB (Ultra Mobile Broadband), IEEE 802.11 (Wi-Fi (Registered Trademark)), IEEE 802.16 (WiMAX (Registered Trademark)), IEEE 802.20, UWB (Ultra-WideBand), Bluetooth (Registered Trademark), system using another proper radio communication method and/or the next-generation system extended based thereon.

The description of "based on" used in the present Description does not mean "based on only", unless otherwise specified. In other words, the description of "based on" means both of "based on only" and "based on at least".

Any references to elements using designations of "first", "second" and the like used in the present Description are not intended to limit the amount or order of these elements overall. These designations are capable of being used in the present Description as the useful method to distinguish between two or more elements. Accordingly, references of first and second elements do not mean that only two elements are adopted, or that the first element should be prior to the second element in any manner.

There is the case where the term of "determining" used in the present Description includes various types of operation. For example, "determining" may be regarded as "determining" calculating, computing, processing, deriving, investigating, looking up (e.g., search in a table, database or another data structure), ascertaining and the like. Further, "determining" may be regarded as "determining" receiving (e.g., receiving information), transmitting (e.g., transmitting information), input, output, accessing (e.g., accessing data in memory) and the like. Furthermore, "determining" may be regarded as "determining" resolving, selecting, choosing, establishing, comparing and the like. In other words, "determining" may be regarded as "determining" some operation.

The terms of "connected" and "coupled" used in the present Description or any modifications thereof mean direct or indirect every connection or coupling among two or more elements, and are capable of including existence of one or more intermediate elements between two mutually "connected" or "coupled" elements. Coupling or connection between elements may be physical, may be logical or may be combination thereof. In the case of using in the present Description, it is possible to consider that two elements are mutually "connected" or "coupled", by using one or more electric wires, cable and/or print electric connection, and as some non-limited and non-inclusive examples, electromagnetic energy such as electromagnetic energy having wavelengths in a radio frequency region, microwave region and light (both visible and invisible) region.

In the case of using "including", "comprising" and modifications thereof in the present Description and the scope of the claims, as in the term of "provided with", these terms are intended to be inclusive. Further, the term of "or" used in the present Description and the scope of the claims is intended to be not exclusive OR.

As described above, the present invention is described in detail, but it is obvious to a person skilled in the art that the invention is not limited to the Embodiment described in the present Description. The invention is capable of being carried into practice as modified and changed aspects without departing from the subject matter and scope of the invention defined by the descriptions of the scope of the claims. Accordingly, the descriptions of the present Description are intended for illustrative explanation, and do not have any restrictive meaning to the invention.

The present application is based on Japanese Patent Application No. 2016-140715 filed on Jul. 15, 2016, entire content of which is expressly incorporated by reference herein.

The invention claimed is:

1. A terminal comprising:
a processor that controls a random access procedure in a cell; and
a transmitter that transmits a random access preamble supporting a first subcarrier spacing and an uplink (UL) data channel to which a second subcarrier spacing is applied,
wherein the terminal determines the first subcarrier spacing by receiving first information indicating the first subcarrier spacing from a base station via higher layer signaling,
wherein the second subcarrier spacing applied to the UL data channel is configured independently of the first subcarrier spacing by receiving second information indicating the second subcarrier spacing from the base station via higher layer signaling,
wherein the terminal supports transmissions of the random access preamble having a sequence number of 839 with the first subcarrier spacing of 1.25 kHz and the random access preamble having the sequence number of 839 with the first subcarrier spacing of 5 kHz, and
wherein a plurality of random access preambles with different subcarrier spacings are time multiplexed or frequency multiplexed.

2. The terminal according to claim 1, wherein the transmitter transmits the random access preamble supporting the first subcarrier spacing repeatedly.

3. The terminal according to claim 1, wherein the processor selects the random access preamble that is associated with the subcarrier spacing based on a given condition.

4. The terminal according to claim 1 wherein, the transmitter transmits the random access preamble by using a preset bandwidth.

5. A radio communication method for a terminal, comprising:
controlling a random access procedure in a cell;
transmitting a random access preamble supporting a first subcarrier spacing; and
transmitting an uplink (UL) data channel to which a second subcarrier spacing is applied,
wherein the terminal determines the first subcarrier spacing by receiving first information indicating the first subcarrier spacing from a base station via higher layer signaling,
wherein the second subcarrier spacing applied to the UL data channel is configured independently of the first subcarrier spacing by receiving second information indicating the second subcarrier spacing via higher layer signaling,
wherein the terminal supports transmissions of the random access preamble having a sequence number of 839 with the first subcarrier spacing of 1.25 kHz and the random access preamble having the sequence number of 839 with the first subcarrier spacing of 5 kHz, and
wherein a plurality of random access preambles with different subcarrier spacings are time multiplexed or frequency multiplexed.

6. A radio base station comprising:
a processor that controls a random access procedure in a cell; and
a receiver that receives, from a terminal, a random access preamble supporting a first subcarrier spacing and an uplink (UL) data channel to which a second subcarrier spacing is applied,
wherein the radio base station transmits, to the terminal, first information indicating the first subcarrier spacing via higher layer signaling to receive the random access preamble supporting the first subcarrier spacing,
wherein the radio base station transmits, to the terminal, second information indicating the second subcarrier spacing via higher layer signaling to configure the second subcarrier spacing independently of the first subcarrier spacing,
wherein the radio base station supports receptions of the random access preamble having a sequence number of 839 with the first subcarrier spacing of 1.25 kHz and the random access preamble having the sequence number of 839 with the first subcarrier spacing of 5 kHz, and
wherein a plurality of random access preambles with different subcarrier spacings are time multiplexed or frequency multiplexed.

7. The terminal according to claim 2, wherein the processor selects the random access preamble that is associated with the subcarrier spacing based on a given condition.

8. The terminal according to claim 2, wherein the transmitter transmits the random access preamble by using a preset bandwidth.

9. The terminal according to claim 3, wherein the transmitter transmits the random access preamble by using a preset bandwidth.

10. A radio communication system comprising:
a radio base station that comprises:
- a first processor that controls a random access procedure in a cell; and
- a receiver that receives, from a terminal, a random access preamble supporting a first subcarrier spacing and an uplink (UL) data channel to which a second subcarrier spacing is applied,
- wherein the radio base station transmits, to the terminal, first information indicating the first subcarrier spacing via higher layer signaling to receive the random access preamble supporting the first subcarrier spacing, and
- wherein the radio base station transmits, to the terminal, second information indicating the second subcarrier spacing via higher layer signaling to configure the second subcarrier spacing independently of the first subcarrier spacing; and a terminal that comprises:
- a second processor that controls a random access procedure in the cell; and
- a transmitter that transmits the random access preamble supporting the first subcarrier spacing and the UL data channel to which the second subcarrier spacing is applied,
- wherein the terminal determines the first subcarrier spacing by receiving the first information indicating the first subcarrier spacing from the base station via higher layer signaling,
- wherein the second subcarrier spacing applied to the UL data channel is configured independently of the first subcarrier spacing by receiving the second information indicating the second subcarrier spacing from the base station via higher layer signaling,
- wherein the terminal supports transmissions of the random access preamble having a sequence number of 839 with the first subcarrier spacing of 1.25 kHz and the random access preamble having the sequence number of 839 with the first subcarrier spacing of 5 kHz, and
- wherein a plurality of random access preambles with different subcarrier spacings are time multiplexed or frequency multiplexed.

* * * * *